United States Patent [19]
Williams

[11] 3,858,285
[45] Jan. 7, 1975

[54] CAPACITOR WINDING
[75] Inventor: Colin Williams, Biggleswade, England
[73] Assignee: Imperial Chemical Industries Limited, London, England
[22] Filed: Dec. 5, 1972
[21] Appl. No.: 312,275

[30] Foreign Application Priority Data
Dec. 22, 1971  Great Britain.................... 59594/71
Feb. 3, 1972   Great Britain...................... 5106/72

[52] U.S. Cl............................... 29/25.42, 242/56.1
[51] Int. Cl............................................ H01g 13/00
[58] Field of Search .......... 29/25.42, 605; 242/56.1; 317/260, 2

[56]         References Cited
         UNITED STATES PATENTS
2,724,562  11/1955  Purdy................................ 242/56.1
2,727,297  12/1955  Fralish et al....................... 29/25.42
2,907,097  10/1959  Shen.................................. 29/25.42
2,955,773  10/1960  Burke................................ 242/56.1
3,545,078  12/1970  Lightner........................ 29/25.42 X FOREIGN PATENTS OR APPLICATIONS
1,248,807  10/1971  Great Britain Primary Examiner—C. W. Lanham
Assistant Examiner—Carl E. Hall
Attorney, Agent, or Firm—Cushman, Darby & Cushman

[57]             ABSTRACT

A method of forming a wound electrical capacitor containing a plurality of windings of which at least one is a synthetic polymeric film, comprising depositing an electrostatic charge on a surface of the film, and winding the electrostatically charged film together with the other windings of the capacitor at a linear speed of at least 1.5 metres per second, the magnitude of the deposited electrostatic charge being such that a wound capacitor having substantially planar end faces is formed.

11 Claims, 1 Drawing Figure

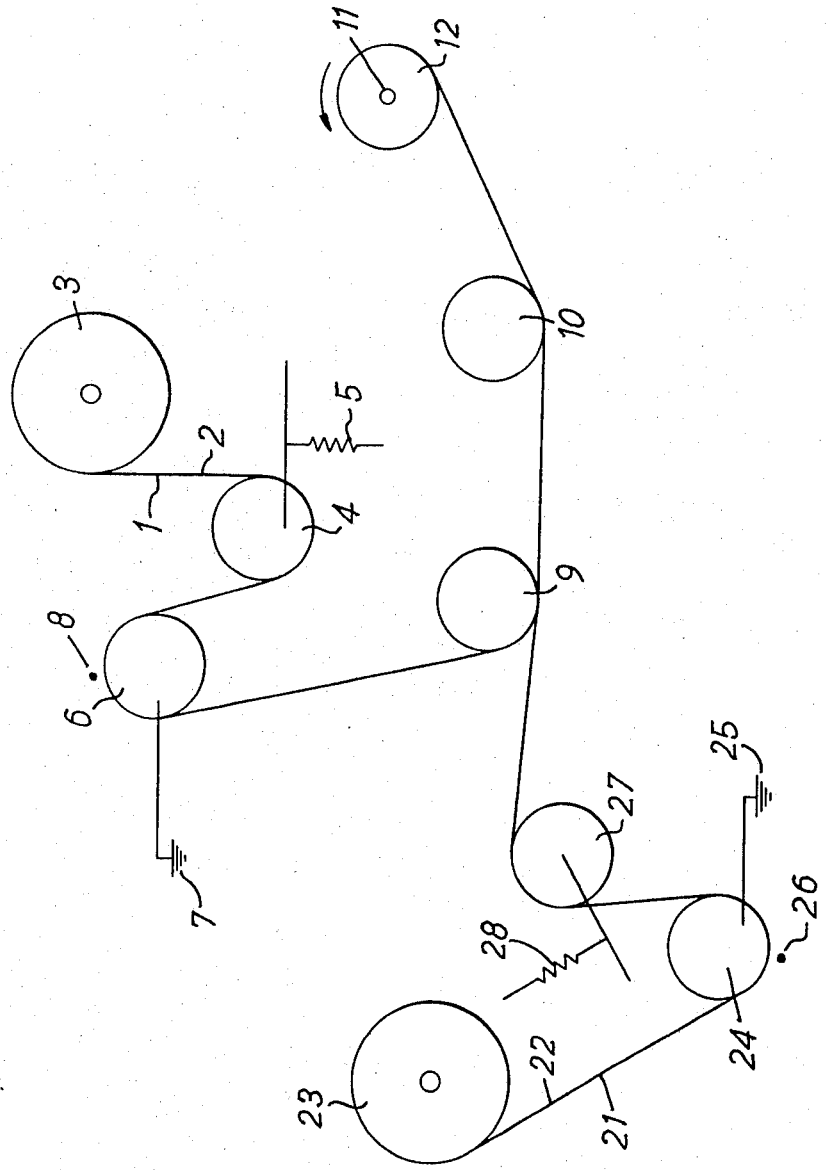

CAPACITOR WINDING

This invention relates to electrical capacitors, and, in particular, to a method of winding an electrical capacitor.

An electrical capacitor consists essentially of a pair of electrically conductive electrodes spaced apart by means of an insulating dielectric spacer disposed therebetween, and a wound capacitor is conveniently formed by winding onto an insulating core member a pair of foil electrodes alternately interleaved with a pair of spacers. These spacers may be made of kraft paper or other cellulosic materials, but preferably of a synthetic resin film employed either alone or in conjunction with one or more kraft paper sheets. A synthetic resin film, for example a film of a polyolefin such as polypropylene, is used as a spacer in preference to a cellulosic sheet dielectric by virtue of its superior power factor characteristics, ability to withstand higher voltage stresses per unit of thickness, and reduced tendency to develop flaws and defects such as pin holes which reduce electrical strength.

If desired, assembly of a capacitor may be facilitated by forming one at least of the electrodes from a metallised dielectric film or spacer, e.g. metallised polypropylene, thereby eliminating the need to employ a separate spacing member. Regenerative or "self-healing" capacitors are commonly of this type.

In the course of preparing a synthetic polymeric film and rendering it suitable for use as a dielectric spacer for a capacitor, it is usually necessary to subject the film to several winding operations. For example, a film prepared by any conventional film-forming technique, will normally be wound on to a reel for storage or despatch to a treatment station or to a customer. Film may then be unwound from the reel to undergo metallising or other treatments, wound up onto another storage reel, and subsequently unwound again at a later period in time to be slit to form strips of film of appropriate width for forming capacitors. Unfortunately, these winding operations are hampered by the inherent tendency of thin polymeric films to adhere tightly to one another and to other flat surfaces with which they come into contact, phenomena commonly referred to as low "slip" and "blocking." Low slip and blocking adversely affect the speed at which the winding operations can be conducted, hinder the production of uniformly slit film, and also lead to the formation of creases in the film which not only adversely affects the quality and uniformity of any metallising operation to which the film is subjected, but also facilitates the entrapment of air pockets between adjacent layers of film when wound into a capacitor whereby electrical strength is reduced, corona starting voltage is lowered, and the capacitors are subject to premature breakdown and shortened operational life.

The aforementioned film-handling difficulties are well recognised in the films industry and are commonly alleviated by incorporation into the film of suitable slip, anti-blocking, and anti-static agents which increase the degree of slip between adjacent layers of film. Preferably, however, films intended for electrical applications, for example in the formation of electrical capacitors, are not additioned with anti-static, slip or anti-blocking agents which might be detrimental to the electrical characteristics of the film. However, the blocking tendency of films for electrical applications may be reduced by providing a rough or matt finish on at least one of the surfaces of the film, for example by embossing the film, or by incorporating an inert particulate material, such as silica, into the film.

Thus, for ease in handling and transporting a polymeric film, it is desirable, and accepted practice, to reduce the coefficient of friction between adjacent layers of the film.

In a wound capacitor, the electrical leads are conveniently attached to respective end faces of the capacitor by means of a sprayed-on metallic coating, and it is, therefore, essential that each end face should be substantially planar to ensure that the sprayed-on coating makes effective electrical contact with the edge of the foil or metallised film which constitutes an electrode of the capacitor. However, we have observed that when the blocking tendency of a film is reduced and its slip is increased to a level at which the film exhibits acceptable handling characteristics, adjacent layers of the film slip relatively to each other when being wound into a capacitor, and it becomes impossible to form a wound capacitor with planar end faces unless the rate of winding is reduced to a commercially unacceptable level, and the film is maintained under relatively high longitudinal tension to prevent wander or transverse slippage of the film. High longitudinal tension also tends to induce crease formation in the film which, as hereinbefore described, is unacceptable in the production of capacitors.

To be suitable for capacitor formation, a film must therefore exhibit two apparently incompatible characteristics, viz. the blocking tendency must be low, and slip tendency must be high, to facilitate handling and treatment of the film, whereas a low slip is required to facilitate the high speed winding of capacitors with substantially planar end faces.

We have now devised a method of winding capacitors at acceptably high speeds which enables film having desirably handling characteristics to be employed.

Accordingly, the present invention provides a method of forming a wound electrical capacitor containing a plurality of windings of which at least one is a synthetic polymeric film, comprising depositing an electrostatic charge on a surface of the film, and winding the electrostatically charged film together with the other windings of the capacitor at a linear speed of at least 1.5 metres per second, the magnitude of the deposited electrostatic charge being such that a wound capacitor having substantially planar end faces is formed.

The invention also provides a wound capacitor whenever prepared by the aforementioned method.

The planarity of a capacitor end face produced in accordance with this invention is desirably such that the maximum axial displacement of any two layers of the film winding relative to each other, excluding any deliberately introduced axial displacement or "stagger," is less than about 2 mm.

The electrostatic charge may be deposited on the film in any suitable manner. Conveniently, deposition of the charge is effected by transporting the film over and in contact with a moving surface spaced a short distance apart from an electrode, a large electrostatic potential difference being maintained between the moving surface and electrode whereby an electrostatic charge is deposited on the surface of the film not in contact with the moving surface.

The moving surface is suitably an endless belt, although a drum or roller is preferred. The surface of the latter is preferably highly polished, e.g. polished chrome steel, to prevent the film being damaged when it contacts the roller, but a matt-surface, or an insulating surface, such as a plastics-coated surface, may be employed.

The moving surface may be earthed, or, alternatively, may be operated at a small floating potential of up to about 2 kv relative to earth potential to minimize the danger of arcing between the moving surface and the electrode.

Although a single roller or other moving surface is normally adequate to provide the desired degree of charge on the film, a plurality of moving surfaces, each associated with an electrode, may be employed if desired.

The electrode is suitably disposed at a distance of less than 100 mm preferably less than 50 mm, from the moving surface on which the film is transported, and is maintained at a suitably high potential, e.g. up to about 30 kv (AC, but preferably DC), relative to the moving surface to ensure that an electrostatic charge of the desired magnitude is deposited on the film. We prefer that the electrode is maintained at a negative potential relative to the moving surface, in which case a significantly higher charge density on the film is achieved than when the electrode is at a positive potential. This is believed to result from the greater mobility of free electrons, the negative voltage charge carriers, compared to that of ions, the positive voltage charge carriers. The electrode preferably extends across the entire width of the film, and may be in the form of a series of spikes arranged in one or more rows and directed towards the film. Alternatively, the electrode may comprise a series of knife-edges, e.g. razor blades, but conveniently is in the form of a wire, suitably a nickel-chrome wire of diameter about 0.18 mm. If desired, a clean electrode wire may be continuously reeled across the film to avoid undue contamination of the electrode, as described in the complete specification of British Patent No. 1,129,136. The electrode may also be heated, if desired, to minimize contamination by condensation of vapours on the electrode, as described in the complete specification of British Pat. No. 1,248,807.

The electrostatic charge may be deposited over the entire surface of the film, or may, if desired, be deposited on a selected area or areas of the surface — for example in the form of one or more strips longitudinally along the film.

We prefer that the magnitude of the deposited electrostatic charge, as measured by a Davenport electrostatic field meter, should not exceed 60 nanocoulombs per square centimetre of film surface ($nC/cm^2$), to avoid creasing the film, and that the magnitude of the charge should not be less than 15 $nC/cm^2$, to prevent the formation of non-planar end faces on the capacitor. In particular, we prefer that the magnitude of the deposited charge should be from 25 to 45 $nC/cm^2$.

If the electrostatically charged film is fed directly to a capacitor winding unit, the linear speed of the moving surface should be at least 1.5 metres per second to match that of the capacitor winder, and, preferably, at least 2.5 metres per second. Linear speeds of the order of 6.0 metres per second are attainable in winding capacitors in accordance with the method of the invention.

The electrostatic charge may be deposited on the film at any convenient stage during the transporting or winding of the film. Thus, although the invention is herein described in terms of an "in-line" capacitor winding system in which an electrostatic charge is deposited on a film as the film approaches a capacitor winding unit, it is to be understood that the electrostatic charge may be deposited at any convenient stage in the earlier transporting, or handling operations to which the film is subjected. For example, the charge may be deposited on a wide film which is being fed to a slitting device where the film is slit into several narrower strips each of a width suitable for winding into a capacitor. It is, therefore, possible to employ a single electrostatic charging device, associated with a plurality of capacitor winders, rather than requiring a separate charging device for each winder. In addition, the presence of a charge on the film being fed to the slitting device enables the film to be uniformly slit at relatively high speeds without noticeable deterioration of the edge profile of the film.

As a film slitting device normally operates at a speed different from that at which a capacitor will be wound, we prefer to wind each strip of slit film onto a wind-up drum, and subsequently to unwind each such strip for feeding to a capacitor winding system at the desired speed. By employing an intermediate wind-up between the slitting and capacitor winding systems, the film may be slit at the most effective slitting speed, independently of the capacitor winding speed, and, of course, any interruption of the slitting operation — for example, by tearing of the film, or resulting from faulty metallisation of the film, does not interrupt the subsequent capacitor winding operation. If desired, however, the slit film may be fed directly, without an intermediate wind-up stage, to the capacitor winding unit.

Polymeric films suitable for use in the method of the present invention, include films formed from any thermoplastic material possessing the required electrical properties and capable of being formed into film by any conventional film-forming technique. Suitable materials include polycarbonates, polysulphones, polyamides such as polyhexamethylene adipamide or polycaprolactam, polyesters such as polyethylene terephthalate and polyethylene-1, 2-diphenoxyethane-4, 4'-dicarboxylate, polyolefins, and vinyl polymers and copolymers. A preferred material is a high molecular weight stereo-regular predominantly crystalline polymer of propylene, either in the form of a homopolymer or copolymerised with minor quantities (e.g. up to 15 percent by weight) of other unsaturated monomers such as ethylene.

Films are suitably formed from these materials in any conventional manner, as, for example, by rolling, extruding, pressing, solvent casting or melt casting techniques, and are preferably oriented by stretching the film to impart strength thereto. A particularly suitable film is produced by melt extruding polypropylene in the form of a tube from an annular die, inflating the tube by the so called "bubble" process to introduce transverse orientation and simultaneously elongating the tube longitudinally to orient the film in a lengthwise direction. The film is then "heat-set" at a temperature below its melting point.

In a preferred embodiment of our invention we employ a metallised film, the film being metallised on one side only, for example — metallised polypropylene film, which serves as a combined electrode and dielectric spacer in the capacitor, thereby eliminating the need for a separate spacing member. Any of the aforementioned films may be metallised, for use in the process of this invention, by conventional metallising techniques, suitably by vacuum deposition in which a metal, such as aluminium, zinc, silver, gold or nickel, is evaporated onto a film located in a chamber maintained under conditions of high vacuum to deposit layer of metal onto one surface of the film. Suitably, the film surface is subjected to chemical or physical treatments, for example, oxidation with mineral acids or exposure to a corona discharge, prior to metallising, thereby to improve the adhesion of the metallic layer to the film substrate. Although a corona discharge treatment is our preferred technique for improving the bonding properties of the film surface, the treatment induces an electrostatic charge on the film surface, and it is desirable that this charge should be eliminated both to facilitate handling of the film prior to metallising and to avoid the incidence of burn or tracking marks, so-called "tree patterns," on the surface of the film, these patterns being created, we believe, by the discharge of the residual charge through an adsorbed layer of air which is usually associated with the film surface. Accordingly, we prefer that the discharge-treated film should be destaticized before metallising, for example by directing a current of ionized air against the charged surface of the film and subsequently subjecting the film to a vacuum, suitably by reeling the film through an evacuated chamber.

In winding or slitting a metallised film in accordance with this invention the electrostatic charge is, of course, deposited on the unmetallised surface of the film.

Suitably a film having dispersed therein and forming projections on at least one surface of the film, from 0.01 to 1 percent by weight, based on the weight of the film, of an inert particulate material having an average particle diameter of from 1 to 5 microns, as described in our copending British Patent application No. 11012/71, or a metallised thermoplastic film having an embossed surface, as described in our copending British Patent application No. 49116/71, may be employed in forming capacitors in accordance with the method of the present invention.

A film suitable for use in forming a capacitor by the method of this invention may contain any of the additives normally employed in thermoplastic films for use in the electrical industry. For example, the thermoplastic film may contain an anti-oxidant, and/or an anti-corrosion agent — such as calcium stearate.

If desired, a capacitor fabricated by the method of the present invention may be impregnated with a suitable dielectric impregnant. By an impregnant we mean any of the fluid impregnating agents conventionally employed in the electrical industry. Examples of suitable impregnants are mineral oil, castor oil, cottonseed oil, silicone oil, and polybutene. Gases under pressure, for example, dry nitrogen or sulphur hexafluoride may also be used.

Conventional capacitor-impregnating techniques are, of course, suitable.

A film suitable for use in accordance with the present invention may vary in thickness from 4 to about 150 microns, but to facilitate the incorporation of the film into capacitors a film thickness of between about 6 and 15 microns is preferred.

A wind-up system of the kind conventionally employed in winding capacitors is suitable for use in accordance with the present invention.

The invention is illustrated by reference to the drawing accompanying this specification which shows a schematic representation of a capacitor winding system in which an electrostatic charge is deposited on each of two webs which are subsequently wound together.

Referring to the drawing, a polypropylene film 1 some 75 mm wide, 10 μm thick, and provided with a zinc coating 2 some 30 mμm thick, was unwound from a storage drum 3, and passed around a tensioning roller 4 resiliently biassed against the tension in the film by spring 5.

The film was then passed around a roller 6 having a chromium plated surface maintained at earth potential by an earthing device 7. As the film passed in contact with the surface of roller 6 it was subjected to an electrical discharge from a nickel-chromium wire electrode 8, 0.18 mm in diameter, extending across the entire width of the film at a distance of about 10 mm from the roller surface, and maintained at an electrical potential of about 10 kv (DC). The film was then fed around idler rollers 9 and 10, and was wound up on core 11 rotating in the direction of the arrow.

Simultaneously, a polypropylene film 21, having dimensions similar to those of film 1, and metallised with zinc on surface 22, was unwound from storage drum 23, passed around chromium plated roller 24 (earthed at 25), and subjected to a 10 kv discharge from nickel-chromium electrode 26. After passing around tensioning roller 27, resiliently biassed by spring 28, film 21 was passed to idler roller 9 over which it ran in contact with electrostatically charged film 1, both films running over idler roller 10, and being wound up on core 11 to form a wound capacitor 12.

By statically charging the film in this way cylindrical capacitors having substantially planar end faces were consistently achieved at film wind up speeds of 3 metres per second and greater. When the static charge treatment was discontinued, the end faces of the capacitor became highly irregular unless the film wind up speed was decreased to the order of 1 metre per second.

The invention is further illustrated by reference to the following Examples.

EXAMPLE 1

Using the apparatus shown in the drawing a pair of polypropylene films each 80 mm wide, 10 μm thick, and coated on one surface with a 30 mμm thick layer of zinc, leaving a narrow, unmetallised edge strip, were wound together to form a capacitor.

The nickel-chromium electrode wires, 8, 26, each 0.18 mm in diameter, were each spaced apart a distance of 10 mm from the associated earthed roller 6, 24, and maintained at a negative potential of 10 kilo volts DC relative to the roller.

Using this system capacitors, 12, were consistently wound with substantially planar end faces at film winding speeds of 4 metres per second. The density of the electrostatic charge deposited at maximum winding speed (i.e., the minimum charge density) was 25 nC/cm$^2$ as measured by a Davenport electrostatic field meter.

In the absence of a deposited electrostatic charge, capacitors with substantially planar end faces could be wound from the same films only be decreasing the film winding speed to 2 metres per second.

EXAMPLE 2

This example illustrates the deposition of an electrostatic charge prior to slitting.

A polypropylene film 534 mm wide, 10 $\mu$m thick, and coated on one surface with a 30 m$\mu$m thick layer of zinc was slit into a plurality of strips on a Dusenbery 635 slitter, an electrostatic charge being deposited on the film upstream of the slitting knives by means of a stainless steel electrode wire, 0.18 mm diameter and approximately 600 mm in length, extending transversely of the film, and directed towards the nonmetallised film surface at a distance of 20 mm therefrom.

The electrode wire was maintained at a negative potential of 11.5 kilovolts DC relative to the film by a Brandenberg, Model 800, regulated DC power supply, and the slit strips were wound into separate reels at a winding speed of 1.8 metres per second without any telescoping of the film being experienced. At this speed the density of the electrostatic charge deposited on the film, measured by a Davenport electrostatic feed meter located on the slitting unit downstream of the electrode wire, was 45 nC/cm$^2$. In the absence of the electrostatic charge, telescoping of the slit reels was experienced when the winding speed exceeded 1.2 metres per second.

After storage for 8 weeks, the slit film strips were wound into capacitors by the method of Example 1. The film subjected to an electrostatic charge during slitting could be wound into a capacitor at a speed of 4.5 metres per second without significantly distorting the planarity of the capacitor end face. The non-discharge treated film formed capacitors with nonplanar end faces at winding speeds of less than 2 metres per second.

I claim:

1. A method of forming a wound electrical capacitor containing a plurality of windings, said windings including at least a pair of electrically conductive electrode films spaced apart by a synthetic polymeric dielectric film, comprising depositing an electrostatic charge on a surface of the dielectric film, and winding the electrostatically charged film together with the other film windings of the capacitor at a linear speed of at least 1.5 metres per second, the magnitude of the deposited electrostatic charge being such that a wound capacitor having substantially planar end faces is formed as a result of prevention of transverse slippage of the films relative to each other during winding.

2. A method according to claim 1 in which deposition of the electrostatic charge is effected by transporting the film over, and in contact with, a moving surface spaced apart from an electrode, and maintaining an electrostatic potential difference between the moving surface and electrode, whereby an electrostatic charge is deposited on the surface of the film not in contact with the moving surface.

3. A method according to claim 2 comprising maintaining between the moving surface and electrode and electrostatic potential difference of up to 30 kilovolts.

4. A method according to claim 1 comprising depositing on the surface of the dielectric film an electrostatic charge of magnitude from 15 to 60 nC/cm$^2$.

5. A method according to claim 1 comprising winding the electrostatically charged film at a linear speed of from 2.5 to 6 metres per second.

6. A method according to claim 1 comprising depositing the electrostatic charge on the dielectric film, slitting the charged film into a plurality of strips, and winding each of the charged strips into a capacitor.

7. A method according to claim 1 wherein the dielectric film is a polyolefin or polyester film.

8. A method according to claim 7 wherein the dielectric film is a crystalline propylene homopolymer or a copolymer thereof with up to 15 percent by weight, based on the weight of the copolymer, of an unsaturated comonomer.

9. A method according to claim 1 wherein the dielectric film is a metallised film.

10. A method according to claim 9 comprising subjecting the dielectric film surface, prior to metallising, to a corona discharge treatment.

11. A method according to claim 10 comprising destaticising the discharge treated film prior to metallising.

* * * * *